United States Patent Office 3,578,455
Patented May 11, 1971

3,578,455
INCREASED SPEED IN R—C—X₃/COLOR FORMER LIGHT SENSITIVE SYSTEM BY ALKALI TREATMENT
Victor P. Petro, Brecksville, James M. Lewis, Cleveland, and Robert D. Fox, University Heights, Ohio, assignors to Horizons Incorporated, a Division of Horizons Research Incorporated
No Drawing. Filed Mar. 11, 1968, Ser. No. 711,832
Int. Cl. G03c 1/72
U.S. Cl. 96—90    25 Claims

ABSTRACT OF THE DISCLOSURE

Photosensitive compositions consisting essentially of (1) an organic halogen compound which produces free radicals when exposed to a suitable dose of radiant energy and (2) a styryl quinoline or other dye base are found to be improved by treatment of the dye base with an alkali metal hydroxide, whereby the resulting composition has more speed, i.e., it can be devloped for longer intervals before the amount of fogging becomes objectionable.

---

The invention herein described was made in the course of or under a contract or subcontract thereunder, with The Systems Engineering Group, Air Force Systems Command.

This invention relates to non-silver photosensitive compositions which are entirely dry working and to their use in photography. More particularly, it relates to compositions which yield an image when exposed photographically and which are then developed by exposing the entire composition to a further dose of radiant energy. The so processed composition may then be fixed by gentle heating.

As described in a number of United States patents issued to Eugene Wainer and others, including those United States patents listed in U.S. Patent 3,095,303, organic halogen containing compounds in which halogen atoms are attached to a terminal carbon atom react when exposed to suitable dosages of electromagnetic radiation, and if a suitable amine or dye base or other color-forming compound is present in the vicinity of the organic halogen compound at the moment of exposure to said dose of radiation, either a visible or a latent image is produced in those exposed areas in which the two constituents are present.

The present invention comprises certain improvements over the prior art directed to the use of color-forming compounds and/or dye-intermediates which react to produce a colored image when exposed to a suitable dose of electromagnetic radiation in the presence of organic halogen compounds of the type described above and which are normally contaminated with significant amounts of dye as an impurity. Briefly, the compositions of the present invention differ from those in the prior art in that a dye base or other color-forming compound is treated with an alkali metal hydroxide before it is utilized photographically in the prior art compositions.

In addition, the incorporation of a non-color-forming secondary or tertiary amine extends the shelf life quality of this stabilized composition from a period of 15 minutes to several weeks.

More specifically, the invention relates to photosensitive compositions comprised of (1) at least one styryl-dye base or other dye base as the basic image former stabilized by the treatment with an alkali metal hydroxide and (2) an appropriate activator, such as iodoform or an analog thereof. In addition, the preferred compositions of this invention contain the following "optional" constituents, each of which contributes to an improved photographic result:

(a) substituted phenols, such as 2,6-di-tert-butyl-p-cresol;
(b) triaryl compounds of Sb, As, Bi or P, such as triphenylstibine;
(c) weak organic bases taken from the class of non-color-forming secondary or tertiary amines; and
(d) a resin binder comprising a polymeric film former.

When this composition is exposed to actinic radiation an image, either latent or visible, is produced. The image is then developed or intensified by exposure to radiant energy in the wavelength region absorbed by the image and in which the original composition is insensitive, after which the developed film may be fixed by heating.

The invention will be more fully understood from the description which follows in which each of the components of the photosensitive compositions of this invention will be described in greater detail.

(1) IMAGE FORMER—ALKALI STABILIZED DYE BASE

The preferred image formers utilized in the compositions of this invention are the dye bases described in U.S. Pat. 3,095,303 and are represented by the following general formula:

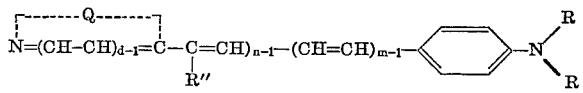

wherein R and R' each represent monovalent radicals selected from the group consisting of lower alkyl (i.e. methyl, ethyl, n-propyl) and benzyl, and may be the same as one another or different from one another; R'' represnts a monovalent radical selected from the group consisting of —H and —CN; $d$ and $n$ each represent a positive integer which is either 1 or 2; $m$ is a positive integer not greater than 3; and the sum of $n-1$ and $m-1$ is not greater than 2; and Q represents the nonmetallic atoms necessary to complete a heterocyclic nucleus necessary to complete heterocyclic compounds. In addition, it is also possible to utilize dye bases of the above type in which the sum of $n-1+m-1$ is equal to 3.

Preferred dye bases which can be stabilized by treatment with an alkali metal hydroxide and utilized in accordance with the present invention include:

2-(p-dimethylaminostyryl)-quinoline
4-(p-dimethylaminostyryl)-quinoline
4-(p-dimethylaminostyryl)-pyridine
4-[4-(p-dimethylaminophenyl)-1,3-butadienyl]-pyridine
4-[4-(p-diethylaminophenyl)-1,3-butadienyl]-pyridine
2-[4-(p-dimethylaminophenyl)-1,3,5-hexatrienyl]-quinoline
2-[4-(p-dimethylaminophenyl)-1,3-butadienyl]-quinoline
4-[4-(p-dimethylaminophenyl)-1,3-butadienyl]-quinoline and other compounds of similar nature.

It has been found that when these compounds are used, as described in United States patent application Ser. No. 696,100 entitled "Photography" filed Jan. 8, 1968 under Docket Z–62, i.e., without having been stabilized, premature fogging occurs during the development step. However, when the dye base is stabilized with an alkali metal hydroxide such as lithium hydroxide, sodium hydroxide, potassium hydroxide, rubidium hydroxide or cesium hydroxide, premature fogging is thereby inhibited. The presence of the alkali metal hydroxide in combination with the dye base appears to remove trace quantities of dye normally present in the dye bases, when prepared by conventional procedures. The trace quantities of dye normally contained in the dye base, if incorporated into the photosensitive compositions of this invention, are indistinguishable from the dye molecules formed when the photosensitive composition is exposed to radiant energy. During the development step in which the latent image (dye) is amplified, the dye originally present as a contaminant in the dye base and distributed uniformly in both the image and non-image areas, produces fog in the uexposed areas of the film. The alkali metal hydroxide also appears to prevent formation of dye from the dye base when this compound is handled under normally acidic atmospheric conditions experienced in a laboratory.

One preferred method of preparing the stabilized styryl base is as follows:

One gram of the styryl base is dissolved in 20 cc. of benzene and a solution of alkali metal hydroxide (lithium hydroxide, sodium hydroxide, potassium hydroxide, rubidium hydroxide or cesium hydroxide) in methanol (10 cc.) is added to the solution containing the styryl base. The volume of the resolutant solution is reduced to approximately ½ of the initial volume over a steam bath. To this solution is added petroleum ether which produces a precipitation. The supernatent liquid is decantated and the resulting precipitate dried under vacuum.

For each gram of styryl compound to be stabilized the following amounts of alkali metal hydroxides have been found suitable.

| | Milligrams |
|---|---|
| LiOH | 3–100 |
| KOH | 3–360 |
| NaOH | 3–120 |
| RbOH | 3–90 |
| CsOH | 3–90 |

An optimum quantity of potassium hydroxide in the above formulation is 60 milligrams of KOH in 10 cc. of methanol. The use of this quantity of KOH when incorporated with one gram of styryl base produced the highest photographic speeds in the resulting composition.

The present invention is applicable not only to the stabilization of photosensitive compositions which include styryl dye bases of the kind indicated, but it is also applicable to the stabilization of photosensitive compositions in which other color-formers are utilized in place of the dye bases described above, including, for example, the photosensitive compositions with cyanine dye bases of the type noted in United States Patent 3,100,703 and polyphenylmethyl carbinol bases of the type described in United States Patent 3,102,029, and polyphenylmethane leuco compounds of the type described in United States Patent 3,342,602.

The following list of dye bases is given to illustrate, but not limit, the types of cyanine bases that can be stabilized by the present invention.

4-[3-methyl-2(3H)benzothiazolidene)-methyl]-quinoline
4-[3-(3-ethyl-2(3H)-benzothiozolyidene)-polypenyl]-quinoline
2-[3-ethyl-2(3H)-benzothiazolylidene-methylene]-benzothiazole
4-[1-cyano-3-(3-ethyl-2(3H)-benzothiazolylidene)-propenyl]-quinoline
4-[1-cyano-3(3-ethyl-2(3H)-benzoxazolylidene)-propenyl]-quinoline The stabilized dye base corresponding to each of the above is prepared in a manner identical to that used for the styryl dye bases described above.

The following list of carbinols and leucos of polyphenylmethane dyes is given to illustrate again, but not limit, the utility of the present invention.

Carbinols of lucos of the triphenylmethane dyes

Opal Blue SS (C.I. 42760)
Crystal Violet (C.I. 42555)
Malachite Green (C.I. 42000)

These materials are stabilized in a manner identical to that used for the dye bases, utilizing similar amounts of alkali metal hydroxide for each gram of cyanine dye base or carbinol or leuco compound.

(2) ORGANIC HALOGEN COMPOUND

The preferred organic halogen compounds useful in the compositions of this invention are those in which three halogen atoms are attached to a single carbon atom. A preferred activator is iodoform. Analogs of $CHI_3$ in which alkyl, aryl, or heterocyclic unsubstituted groups are substituted for the hydrogen in the iodoform are also effective. Other activators, such as carbon tetrabromide and others of the compounds described in the above noted patents, can be used, but they are not as effective in producing high speeds as iodoform and other tri-iodo compounds.

(3) FOG INHIBITORS (OPTIONAL, BUT PREFERRED)

Substituted phenols utilized with or without the addition of triphenylstibine, triphenylarsine, triphenylbismuthine or triphenylphosphine to the photosensitive compositions of this invention have been found to be effective as fog inhibitors. Sutiable amounts of these compounds in the photosensitive composition prevents fogging during the development step.

(4) SHELF LIFE STABILIZERS (OPTIONAL, BUT PREFERRED)

It has been found that shelf life of several weeks can be imparted to the photosensitive compositions of this invention by the inclusion of weak non-color-forming organic secondary or tertiary aryl amines. A preferred compound for this purpose is triphenylamine. It has been found that in compositions identical in all ingredietns with the exception of this added aryl amine exhibit drastic differences in shelf life. In compositions not containing the tertiary or secondary amine, a useful shelf life as short as one hour has been observed and in those to which the secondary or tertiary amine was added, useful shelf life has been extended to several weeks.

(5) SUPPORT

The above constituents in solution can be applied to a paper base or to any other absorbent inert substrate, or, as may be preferred, the photoactive ingredients may be dispersed in polymeric film formers, such as polystyrene, styrene copolymers, or polycarbonates or carbonate copolymers, or polymethyl methacrylate or other acrylate copolymers.

Given below are several examples of photosensitive compositions representative of this invention.

Example I

| | Milligrams |
|---|---|
| 4-(p-dimethylaminostyryl) - quinoline (treated with an alkali metal hydroxide, as described above) | 25–100 |
| Triphenylamine | 25–100 |
| 2,6-di-tert-butyl-p-cresol | 50–100 |
| Iodoform | 100–400 |
| Triphenylstibine | 0–50 |

Example II

| | Milligrams |
|---|---|
| 2-(p-dimethylaminostyryl) - quinoline (treated with an alkali metal hydroxide, as described above) | 25–100 |
| Triphenylamine | 25–100 |
| 2,6-di-tert-butyl-p-cresol | 50–100 |
| Iodoform | 100–400 |
| Triphenylstibine | 0–50 |

Example III

| | Milligrams |
|---|---|
| 2 - [4 - (p - dimethylaminophenyl)-1,3-butadienyl]-quinoline (stabilized with an alkali metal hydroxide, as described above) | 25–100 |
| Triphenylamine | 25–100 |
| 2,6-di-tert-butyl-p-cresol | 50–100 |
| Iodoform | 100–400 |
| Triphenylstibine | 0–50 |

Example IV

| | Milligrams |
|---|---|
| 4 - [4 - (p - dimethylaminophenyl)-1,3-butadienyl]-quinoline (stabilized with an alkali metal hydroxide, as described above) | 25–100 |
| Triphenylamine | 25–100 |
| 2,6-di-tert-butyl-p-cresol | 50–100 |
| Iodoform | 100–400 |
| Triphenylstibine | 0–50 |

The above compositions are each prepared by bringing the constituents together in a suitable solvent-binder system under a safelight or in total darkness and, after thoroughly mixing the composition, applying it to a solid substrate, such as baryta paper or a film of polyester, glass or other suitable support.

The following compositions were each prepared in the same manner as described above.

Example V (cyanine dye base)

| | Milligrams |
|---|---|
| 4 - [3 - methyl - 2(3H)benzothiazolidene)methyl]quinoline [1] | 25–100 |
| Triphenylamine | 25–100 |
| 2,6-di-tert-butyl-p-cresol | 50–100 |
| Iodoform | 100–400 |

See footnote in Example VII.

Example VI (cyanine dye base)

| | Milligrams |
|---|---|
| 4 - [3 - (3 - ethyl - 2(3H)-benzothiazolylidene)propenyl]-quinoline [1] | 25–50 |
| Triphenylamine | 25–100 |
| 2,6-di-tert-butyl-p-cresol | 50–100 |
| Iodoform | 100–400 |

Example VII (carbinol base)

| | Milligrams |
|---|---|
| Carbinol base of the dye Opal Blue SS (C.I. 42760) [1] | 5–50 |
| Triphenylamine | 25–100 |
| 2,6-di-tert-butyl-p-cresol | 50–100 |
| Iodoform | 100–400 |

[1] Treated with an alkali metal hydroxide, as described above.

After the composition has been laid down as a thin film, it is permitted to dry in air in the dark or under a safelight, and then it is photographically exposed. After exposure, the latent image is developed by exposing the film to radiant energy of an appropriate intensity (approximately 1.5–3.0 kw.) and suitable wavelengths (e.g. 600–1200 m$\mu$) for a period of time in the range of 15 to 300 seconds. It has been found it is necessary to heat the films in a current of warm air (approximately 50°–70° C.) to obtain fairly rapid development and higher speeds. After development, the film is heated at 120–140° C. in moving air for approximately 2 minutes in order to fix the image.

A typical example of exposure can be made with a composition given in Example I. An exposure of 0.2 mw.-sec./cm.$^2$ at 488 m$\mu$ will produce a density of 1.0 with a gamma of 1.3, D max. 2.6 (green) and a log exposure scale of 2.0. Development times of the order of 18–60 seconds are required. It has been demonstrated that this composition will produce speeds in the range of 0.1 to 0.3 ASA with a base plus fog of 0.1 density units.

The present invention is applicable not only to the stabilization of photosensitive compositions which include styryl dye bases of the kind indicated, but it also applicable to the stabilization of photosensitive compositions in which other dye bases are utilized in place of the styryl dye bases described above including, for example, the photosensitive compositions with cyanine dye bases of the type noted in U.S. Pat. 3,100,703 and merocyanine dye bases of the type described in U.S. Pats. 3,106,466 and 3,109,736 or indeed any other color-formers which react to produce a colored image when exposed to actinic radiation while admixed with organic halogen compounds of the type described and which are normally contaminated with significant amounts of dye as an impurity.

The improvement in photographic speed and in shelf-keeping qualities is illustrated in the following Table in which the compositions of Examples I, IV, V, VI and VII with alkali treated color-formers are compared with otherwise identical compositions in which the alkali treatment of the color-former has been omitted.

The mechanism by which the alkali treatment operates is not entirely clear, but it appears most probable that it is due to the formation of complexes between the contaminants present in the color-forming constituent of the composition and the alkali metal hydroxide.

| Examples I, IV, V, VI, and VII | Photographic Speed, A.S.A. | | Shelf Life | |
|---|---|---|---|---|
| | Not stabilized | Stabilized | Not stabilized | Stabilized |
| 4-(p-dimethylaminlstyryl)-quinoline | 0.10 | 0.3–0.4 | 1 to 2 hours | 1 week. |
| 4-[4-(p-dimethylaminophenyl)1,3-butadienyl]quinoline | 0.001 | 0.01–0.10 | 2 to 4 hours | Do. |
| 4-[(3-methyl-2(3H)benzothiazolidene)methyl]quinoline | 0.001 | 0.008 | do | 8 hours. |
| 4-[3(3-ethyl-2(3H)benzothiazolidene)methyl]quinoline | 0.00001–0.0001 | 0.01 | 1 to 2 minutes | 1 to 2 hours. |
| Carbinol of Opal Blue SS | 0.0001 | 0.0006 | 1 hour | 24 hours. |

We claim:

1. A non-silver photosensitive composition consisting essentially of (1) at least one organic halogen compound in which at least three halogen atoms selected from the group consisting of Cl, Br and I are attached to a single carbon atom and (2) at least one stabilized color-forming compound selected from the group consisting of styryl dye bases and higher vinylogous homologs of said dye bases; cyanine dye bases, and leuco- and carbinoltriphenylmethane compounds, said color-forming compound having been stabilized against formation of dye therefrom by contact with air or other acidic influences in the absence of exposure to radiant energy for the purpose of forming dye from said color-forming compound, by complexing said color-forming compound, in solution, with alkali metal hydroxide.

2. The composition of claim 1 wherein the color-forming compound (2) has been treated with at least about 3 milligrams of alkali metal hydroxide for each gram of color-forming compound.

3. The composition of claim 1 wherein the color-forming compound is selected from the group consisting of styryl dye bases and higher vinylogous homologs of said dye bases; cyanine dye bases and leuco- and carbinol-triphenyl methane compounds.

4. The composition of claim 1 wherein the non-silver photosensitive composition includes a small amount of a weak organic base selected from the group consisting of secondary and tertiary aryl amines.

5. The composition of claim 4 containing, in addition, at least one substituted phenol.

6. The composition of claim 1 wherein the constituents of the composition are dispersed in a polymeric film-forming binder.

7. The composition of claim 1 wherein the constituents are supported on an absorbent material.

8. The composition of claim 7 wherein the absorbent material is paper.

9. The composition of claim 1 including, in addition, at least one substituted phenol.

10. The composition of claim 1 including, in addition, a triaryl compound of an element selected from the group consisting of Sb, As, Bi and P.

11. A photographic process which comprises preparing the composition of claim 1; exposing said composition to a pattern of radiation having a significant portion of its energy output in the visible region; and then developing a visible image in said composition by exposing the same to radiant energy having a wavelength band in the region from about 600 m$\mu$ to about 12 m$\mu$.

12. The process of claim 11 inclduing, in addition, fixing the visible image in said composition by gently heating the composition after the visible image has been developed.

13. The composition according to claim 1 and comprising the composition of Example I.

14. The composition according to claim 1 and comprising the composition of Example II.

15. The composition according to claim 1 and comprising the composition of Example III.

16. The composition according to claim 1 and comprising the composition of Example IV.

17. The composition according to claim 1 and comprising the composition of Example V.

18. The composition according to claim 1 and comprising the composition of Example VI.

19. The composition according to claim 1 and comprising the composition of Example VII.

20. A stabilized color forming compound for use in a photosensitive composition as defined in claim 1 comprising: a complex formed in solution, an alkali metal hydroxide and a color-forming compound selected from the group consisting of styryl dye bases and higher vinylogous homologs of said dye bases, cyanine dye bases and leuco- and carbinol-triphenylmethane compounds, there being at least about 3 mg. hydroxide per gram of color-forming compound.

21. A non-silver photosensitive composition consisting essentially of
 (1) at least one organic halogen compound in which at least three halogen atoms selected from the group consisting of Cl, Br and I are attached to a single carbon atom;
 (2) at least one stabilized color-forming compound selected from the group consisting of styryl dye bases and higher vinylogous homologs of said dye bases, cyanine dye bases, and leuco- and carbinol-triphenylmethane compounds, said color-forming compound having been stabilized against formation of dye therefrom by contact with air or other acidic influences in the absence of exposure to radiant energy for the purpose of forming dye from said color-forming compound, by complexing said color-forming compound, in solution, with alkali metal hydroxide;
 (3) a substituted cresol;
 (4) a triaryl compound of an element selected from the group consisting of Sb, As, Bi and P; and
 (5) a weak organic base selected from the group consisting of secondary and tertiary arylamines.

22. In a non-silver photosensitive composition which consists essentially of (1) at least one organic halogen compound which produces free radicals when exposed to a suitable dose of radiant energy and which is characterized by having a single carbon atom to which at least three halogen atoms are directly attached, the halogen atoms being selected from the group consisting of chlorine, bromine, and iodine, and (2) at least one stabilized color-forming compound selected from the group consisting of styryl dye base and higher vinyl homologs, cyanine dye bases, carbinols and leucos of triphenylmethanes, which color-forming compounds have been stabilized against formation of dye therefrom by contact with air or other acidic influences in the absence of intentional exposure to radiant energy for the purpose of forming dye from said color-forming compound; the improvement which comprises: complexing the color-forming compound, in solution, with an alkali metal hydroxide prior to incorporating the same in said non-silver photosensitive composition.

23. The composition of claim 22 containing, in addition, at least one substituted phenol.

24. The composition of claim 22 wherein the amount of alkali metal hydroxide used in said treating step is between about 3 milligrams and 360 milligrams for each gram of color-formers.

25. The composition of claim 22 to which there has been added a weak organic base selected from the group consisting of secondary and tertiary aryl amines.

References Cited

UNITED STATES PATENTS 3,035,916 5/1962 Heiart _____ 96—88
3,095,303 6/1963 Sprogue et al. _____ 96—90

NORMAN G. TORCHIN, Primary Examiner

R. E. FICHTER, Assistant Examiner

U.S. Cl. X.R.

96—48